F. O. KILGORE.
HANGER FOR CUSHIONING DEVICES.
APPLICATION FILED JAN. 10, 1910.
994,007.
Patented May 30, 1911.
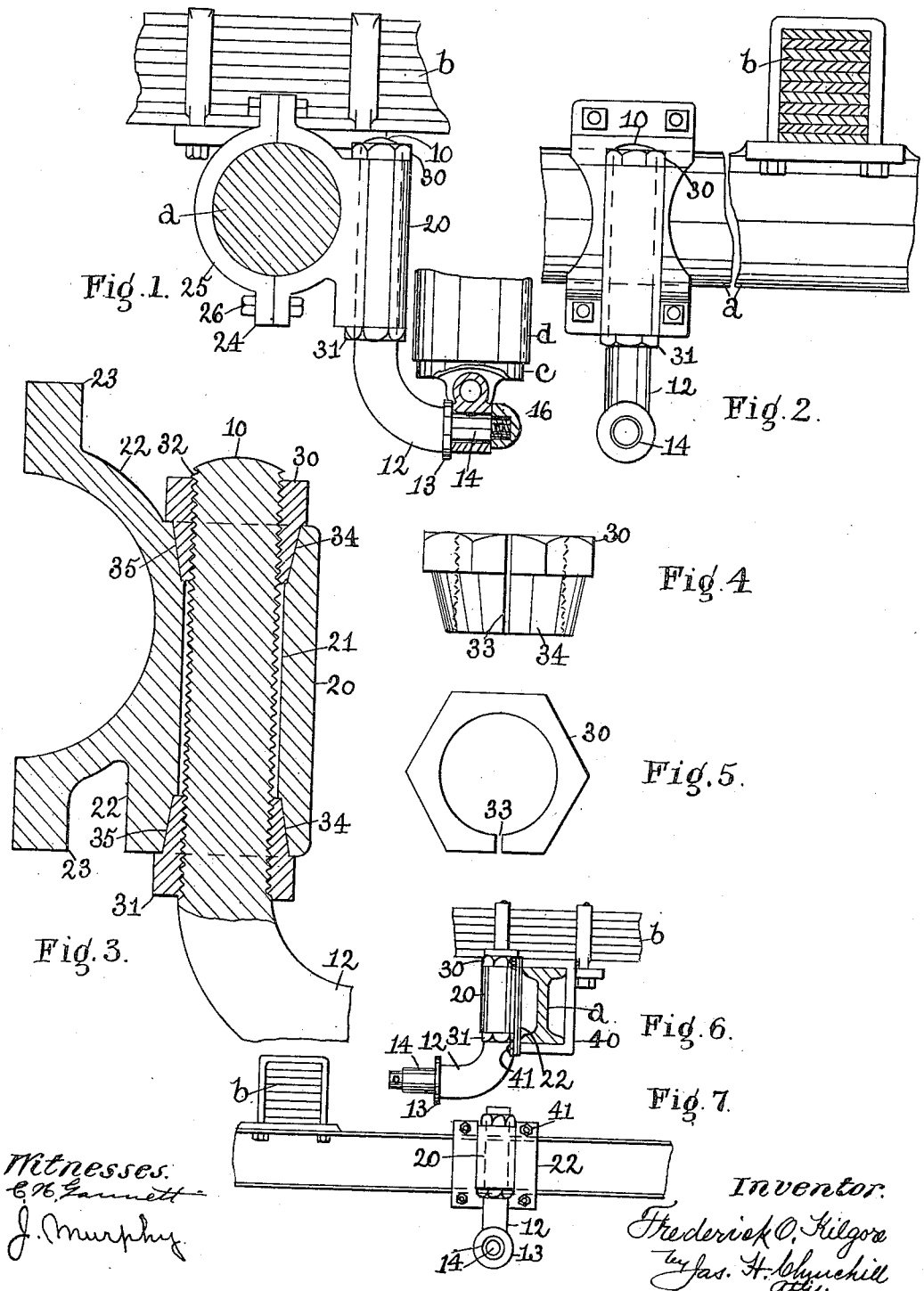

UNITED STATES PATENT OFFICE.

FREDERICK O. KILGORE, OF SOMERVILLE, MASSACHUSETTS, ASSIGNOR TO KILGORE MANUFACTURING COMPANY, OF BOSTON, MASSACHUSETTS, A CORPORATION OF MAINE.

HANGER FOR CUSHIONING DEVICES.

994,007. Specification of Letters Patent. Patented May 30, 1911.

Application filed January 10, 1910. Serial No. 537,162.

*To all whom it may concern:*

Be it known that I, FREDERICK O. KILGORE, a citizen of the United States, residing in Somerville, county of Middlesex, and State of Massachusetts, have invented an Improvement in Hangers for Cushioning Devices, of which the following description, in connection with the accompanying drawings, is a specification, like letters on the drawings representing like parts.

This invention relates to a hanger especially designed and adapted to be used as a support for cushioning devices employed on automobiles to absorb the shock occasioned by the vehicle riding over rough roads.

The present invention has for its object to provide a simple and efficient hanger, which enables the cushioning device to be adjusted after it has been applied to the car and without detaching the hanger from the cushioning device. Provision is also made for firmly securing the hanger in its adjusted position as will be described. These and other features of this invention will be pointed out in the claim at the end of this specification.

Figure 1 represents in elevation and section a sufficient portion of an automobile and a cushioning device attached thereto by a hanger embodying this invention to enable it to be understood. Fig. 2, a side elevation of the parts shown in Fig. 1, looking toward the left, the cushioning device being omitted. Fig. 3, a detail on an enlarged scale of the hanger shown in Fig. 1. Figs. 4 and 5, details to be referred to, and Figs. 6 and 7, modifications to be referred to.

Referring to the drawings, *a* represents an axle of the automobile or other vehicle; *b*, a supporting spring for the body of the vehicle; and *c*, *d*, the cylindrical members of a cushioning device, which may be such as shown and described in U. S. Patents No. 889,619 and No. 923,858 granted to me June 2, 1908, and June 8, 1909 respectively.

The member *d* of the cushioning device is suitably connected with the car body, and the member *c* is connected with the axle *a* by a hanger embodying this invention and comprising a supporting member and a socket member into which the supporting member is extended and secured therein.

The supporting member is herein shown as a substantially straight rod 10 provided at its lower end with an arm 12 extended substantially at right angles to the rod 10. The arm 12 is provided as herein shown with a collar or flange 13 and a reduced end portion 14 upon which the member *c* of the cushioning device is placed (see Fig. 1) and is retained thereon by a cap 16 secured by a cotter pin, not shown, or otherwise.

The socket member comprises a boss 20 having an opening 21 extended through it and constituting a socket for the reception of the rod 10. The boss 20 is secured to or forms part of a back piece 22, which may be curved or substantially semi-circular in shape to conform to the axle *a* and is provided with ears 23, which coöperate with the ears 24 on a yoke or clip 25 and are fastened thereto by bolts 26, which serve to secure the socket member in fixed relation to the axle *a*. The rod 10 is capable of longitudinal and rotary movement in the socket or hollow boss 20, and provision is made for securing the said rod in fixed relation to said hollow boss or socket member. This result may and preferably will be accomplished as herein shown, by means of nuts 30, 31, which engage screw-threads 32 on the rod 10 at the opposite ends of the socket member, said nuts being provided with longitudinally extended slots 33 and tapered exterior end portions 34, which coöperate with correspondingly tapered seats 35 in the opposite ends of the hollow boss. The interior of the hollow boss or socket member is left unthreaded, so that the rod 10 may be bodily moved longitudinally in said hollow boss substantially in an instant to effect vertical adjustment of the supporting member or hanger proper, and thereby effect vertical adjustment of the member *c* of the cushioning device without detaching the hanger from the cushion, and when said hanger is properly positioned, it may be secured in this position by turning up the nuts 30, 31, against the ends of the socket member of the hanger. The split tapered nuts are contracted by the tapered end walls 35 of the socket or opening 21 and are caused to firmly grip the threaded hanger and thus practically lock it in its adjusted position.

The hanger before it is locked in fixed relation to the socket member is capable of turning in its socket so as to properly aline the two members of the cushioning device, or so as to clear an obstruction if any should exist. It will be observed that the rotary and longitudinal adjustments of the hanger may be effected without detaching the hanger from the cushioning device and after the latter has been attached to the vehicle, which is a very desirable feature.

In Figs. 1, 2 and 3, the socket member is shown as provided with a curved back piece to fit a circular axle, but it is not desired to limit the invention in this respect, as the back piece may be of other shapes to conform to other shapes of axles or other parts of the vehicle.

In Figs. 6 and 7, the axle *a* is shown as an I-beam in cross-section and the back piece 22 of the socket member is shown as a plate, which is secured to the I-beam axle by yokes or clips 40 and nuts 41.

I may prefer to use the tapered split nuts 30, 31, but the ordinary nuts may be used to good advantage.

It is not desired to limit the invention to the particular construction of hanger herein shown.

Claim:

In a hanger of the character described, in combination, a socket member provided with a hollow boss having tapered seats at its ends, a supporting member comprising a threaded rod extended through said hollow boss and having an arm extended at an angle to said rod, split nuts to engage said threaded rod at opposite ends of said boss and having exteriorly tapered ends which coöperate with the tapered seats of said boss, substantially as described.

In testimony whereof, I have signed my name to this specification in the presence of two subscribing witnesses.

FREDERICK O. KILGORE.

Witnesses.
JAS. H. CHURCHILL,
J. MURPHY.

---

Copies of this patent may be obtained for five cents each, by addressing the "Commissioner of Patents, Washington, D. C."